United States Patent
Inoue et al.

(10) Patent No.: US 11,325,360 B2
(45) Date of Patent: May 10, 2022

(54) MULTILAYER BODY, PACKAGING CONTAINER, AND FOOD STORING METHOD

(71) Applicant: MITSUBISHI GAS CHEMICAL COMPANY, INC., Tokyo (JP)

(72) Inventors: Atsushi Inoue, Tokyo (JP); Yoshiki Itou, Tokyo (JP); Yusuke Tanaka, Tokyo (JP); Kenichi Niimi, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 345 days.

(21) Appl. No.: 16/097,987

(22) PCT Filed: Oct. 31, 2017

(86) PCT No.: PCT/JP2017/039401
§ 371 (c)(1),
(2) Date: Oct. 31, 2018

(87) PCT Pub. No.: WO2018/105274
PCT Pub. Date: Jun. 14, 2018

(65) Prior Publication Data
US 2019/0143658 A1    May 16, 2019

(30) Foreign Application Priority Data
Dec. 9, 2016  (JP) .............................. JP2016-239658

(51) Int. Cl.
| | | |
|---|---|---|
| *B32B 27/18* | (2006.01) | |
| *B32B 27/08* | (2006.01) | |
| *B65D 81/26* | (2006.01) | |
| *B65D 85/50* | (2006.01) | |
| *B65D 81/24* | (2006.01) | |
| *B65D 65/40* | (2006.01) | |

(52) U.S. Cl.
CPC .............. *B32B 27/18* (2013.01); *B32B 27/08* (2013.01); *B65D 81/24* (2013.01); *B65D 81/26* (2013.01);
(Continued)

(58) Field of Classification Search
CPC ..... B32B 27/18; B32B 27/08; B32B 2439/70; B32B 2307/7244; B32B 2307/74;
(Continued)

(56) References Cited

U.S. PATENT DOCUMENTS

| | | | | |
|---|---|---|---|---|
| 2002/0012808 A1* | 1/2002 | Ishizaki | ................. | B32B 38/00 428/516 |
| 2008/0138549 A1 | 6/2008 | Kitahara | | |

(Continued)

FOREIGN PATENT DOCUMENTS

| | | |
|---|---|---|
| CN | 104603195 A | 5/2015 |
| CN | 105813845 A | 7/2016 |

(Continued)

OTHER PUBLICATIONS

International Search Report in International Patent Application No. PCT/JP2017/039401, dated Feb. 6, 2018, with English translation.

*Primary Examiner* — James C Yager
(74) *Attorney, Agent, or Firm* — Greenblum & Bernstein, P.L.C.

(57) ABSTRACT

A multilayer body comprising a sealing layer (A) comprising a thermoplastic resin, an oxygen absorption layer (B) comprising a thermoplastic resin and iron powder, and an oxygen barrier layer (D) having oxygen barrier properties, the layers being laminated in a described order, wherein at least one of the sealing layer (A) and the oxygen absorption layer (B) comprises an ionomer as the thermoplastic resin.

6 Claims, 1 Drawing Sheet

(52) U.S. Cl.
CPC ........... *B65D 81/266* (2013.01); *B65D 85/50* (2013.01); *B32B 2264/105* (2013.01); *B32B 2307/20* (2013.01); *B32B 2307/7244* (2013.01); *B32B 2307/74* (2013.01); *B32B 2307/758* (2013.01); *B32B 2398/20* (2013.01); *B32B 2439/70* (2013.01); *B65D 65/40* (2013.01); *B65D 81/267* (2013.01); *Y10T 428/1352* (2015.01); *Y10T 428/1379* (2015.01); *Y10T 428/1383* (2015.01)

(58) Field of Classification Search
CPC ........ B32B 2307/758; B32B 2264/105; B32B 2307/20; B32B 2398/20; B65D 81/266; B65D 85/50; B65D 81/267; B65D 65/40; B65D 81/24; B65D 81/26; Y10T 428/1383; Y10T 428/1352; Y10T 428/1379
See application file for complete search history.

(56) References Cited

U.S. PATENT DOCUMENTS

| | | | |
|---|---|---|---|
| 2008/0269388 A1* | 10/2008 | Markovich | C08L 53/025 524/210 |
| 2012/0064272 A1 | 3/2012 | Nakao et al. | |
| 2015/0203678 A1 | 7/2015 | Itoh et al. | |
| 2015/0353251 A1 | 12/2015 | Kagimoto et al. | |
| 2016/0297182 A1 | 10/2016 | Oda et al. | |
| 2016/0303834 A1 | 10/2016 | Kato et al. | |

FOREIGN PATENT DOCUMENTS

| | | |
|---|---|---|
| EP | 2 433 793 | 3/2012 |
| JP | 59-16303 Y2 | 5/1984 |
| JP | 62-54704 B2 | 11/1987 |
| JP | 8-323933 A | 12/1996 |
| JP | 9-278024 A | 10/1997 |
| JP | 2001-354817 A | 12/2001 |
| JP | 2002-1879 A | 1/2002 |
| JP | 2004-18660 A | 1/2004 |
| JP | 2005-87991 A | 4/2005 |
| JP | 2006-70108 A | 3/2006 |
| JP | 2006-181778 A | 7/2006 |
| JP | 2009-227296 A | 10/2009 |
| JP | 2010-234525 A | 10/2010 |
| JP | 2012-240329 A | 12/2012 |
| KR | 10-2015-0114467 A | 10/2015 |
| KR | 10-2016-0094954 A | 8/2016 |
| WO | 2003/024236 A1 | 3/2003 |
| WO | 2010/134137 A1 | 11/2010 |

\* cited by examiner

[Fig. 1]
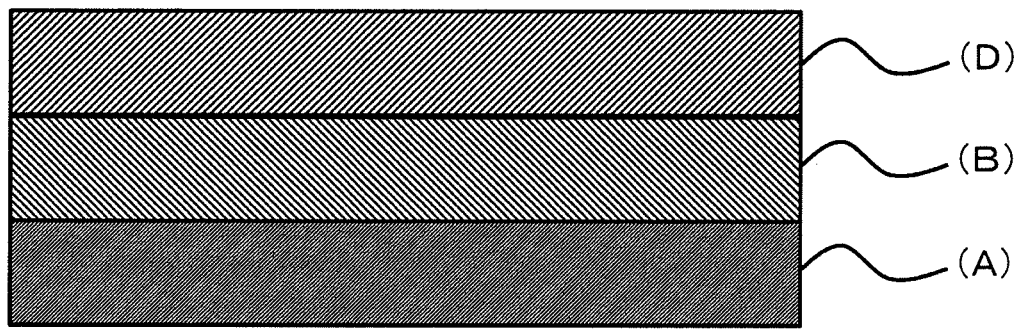
[Fig. 2]
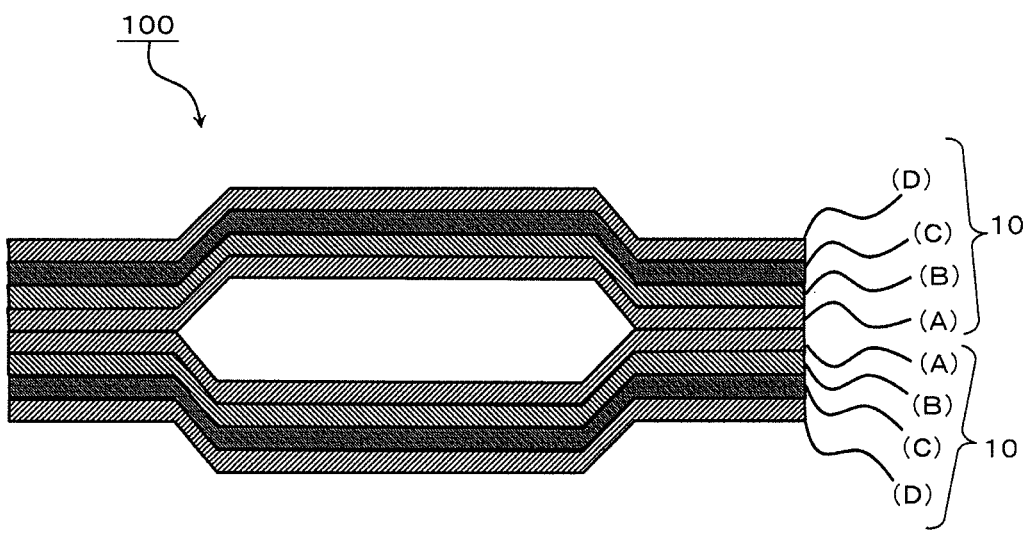

MULTILAYER BODY, PACKAGING CONTAINER, AND FOOD STORING METHOD

TECHNICAL FIELD

The present invention relates to a multilayer body, a packaging container, and a food storing method.

BACKGROUND ART

Conventionally, in order for prevention of oxidation and long-term storage of a variety of articles represented by foods, beverages, pharmaceuticals, medical supplies, cosmetics, metal products, and electronic products that are likely to be deteriorated or degraded due to the influence of oxygen, an oxygen scavenger is used that removes oxygen in packaging containers and packaging bags accommodating them.

The form of this oxygen scavenger developed in early days and still often used is an air-permeable sachet filled with the oxygen scavenger composed of powdery or granular iron powder, ascorbic acid, and the like.

In recent years, a film oxygen scavenger is also used that is easier to handle, has a broader range of applications, and is extremely unlikely to be accidentally ingested. Various such film oxygen scavengers are proposed.

For example, Patent Document 1, with an intention to provide a laminate film that suppresses odor causing substances, discloses a laminate film formed by laminating an outer layer/a first adhesive layer/a barrier layer/a second adhesive layer/an oxygen absorption layer/a chemical adsorption layer/a sealing layer in this order, wherein an iron powder oxygen absorber is used in the oxygen absorption layer. The generated odor causing substances are aldehydes and acids, and in the proposed laminate film, amine compound-supported silicon dioxide that chemically adsorbs odor causing substances is used in the chemical adsorption layer.

Also, Patent Document 2, with an intention to provide, for example, an oxygen absorber (an oxygen absorbing material) having excellent oxygen absorbability, proposes an oxygen absorber that is characterized by containing a polymer having an ethylene unit and a carbonyl group in the main chain or an ionomer of an ethylene unsaturated carboxylic acid copolymer. In Patent Document 2, the polymer and the ionomer are described as having oxygen absorbability and being capable of initiating an oxidation reaction by being irradiated with light or energy rays or heated.

CITATION LIST

Patent Document

Patent Document 1: Japanese Patent Application Laid-Open No. 2012-240329
Patent Document 2: Japanese Patent Application Laid-Open No. 2005-87991

SUMMARY OF INVENTION

Technical Problem

However, when the laminate film described in Patent Document 1 is used in food storing applications, water released from food comes into contact with the odor absorption layer before coming into contact with the oxygen absorption layer, thus water is absorbed by the odor absorption layer, and accordingly the amount of water supplied to the oxygen absorption layer is reduced. As a result, the amount of oxygen absorbed is reduced, and the rate of oxygen absorbed is also lowered.

Patent Document 2 discloses an oxygen absorber containing an ionomer and cobalt as a metal catalyst in the Examples thereof, and according to the technology thereof, the ionomer and oxygen undergoes a reaction that is catalyzed by cobalt, and the ionomer absorbs oxygen. However, the oxygen absorbability of the ionomer itself is not high and, as a result, the rate of oxygen absorbed is lowered. Moreover, Patent Document 2 is completely silent on odor absorption.

After all, the laminate film and the oxygen absorber described in the respective documents have room for further improvement with respect to retaining excellent oxygen absorbing and also reducing an odor.

Moreover, in the case of using an oxygen scavenger, food is hermetically closed in a gas barrier container. Therefore, the odor is confined within the container, and a foreign smell and deterioration of the food taste resulting from the odor become problematic. Possible causes of odor generation are generation of an odor from food, generation of an odor due to the degradation of an oxygen scavenger substance associated with the absorption of oxygen by the oxygen scavenger, generation of an odor due to contact between the oxygen scavenger and substances in the food, and the like.

The present invention was made in view of the above-described circumstances, and one of the objects is to provide a multilayer body capable of retaining excellent oxygen absorbing and sufficiently suppressing an odor, a packaging container in which the multilayer body is used, and a food storing method in which the packaging container is used.

Also, another object of the present invention is to provide a multilayer body capable of highly maintaining the flavor of food by reducing an odor and suppressing permeation of oxygen from outside air when the food is packed and stored, a packaging container in which the multilayer body is used, and a food storing method in which the packaging container is used.

Solution to Problem

As a result of having conducted diligent research to achieve the above objects, the inventors found that by using an oxygen absorption layer and/or a sealing layer containing specific components, it is possible to provide a multilayer body capable of retaining excellent oxygen absorbing and sufficiently suppressing an odor, a packaging container in which the multilayer body is used, and a food storing method in which the packaging container is used, and accomplished the present invention. Moreover, the inventors found that by using such a multilayer body and the like for storing food to reduce an odor and, furthermore, suppress permeation of oxygen from outside air, the flavor of the food can be highly maintained, and accomplished the present invention.

That is to say, the present invention is as set forth below.

(1) A multilayer body comprising a sealing layer (A) comprising a thermoplastic resin, an oxygen absorption layer (B) comprising a thermoplastic resin and iron powder, and an oxygen barrier layer (D) having oxygen barrier properties, the layers being laminated in a described order, wherein at least one of the sealing layer (A) and the oxygen absorption layer (B) comprises an ionomer as the thermoplastic resin.

(2) The multilayer body according to (1), further comprising an odor absorption layer (C) comprising a thermoplastic resin and an inorganic base between the oxygen absorption layer (B) and the oxygen barrier layer (D).

(3) The multilayer body according to (2), wherein the inorganic base is an inorganic base having calcium.

(4) A packaging container comprising the multilayer body according to any of (1) to (3), with the sealing layer (A) comprising a thermoplastic resin being on inside, and the oxygen barrier layer (D) having oxygen barrier properties on outside.

(5) A food storing method, wherein food is packed and stored in the packaging container according to (4).

(6) The storing method according to (5), wherein the food has a water activity (Aw) of 0.3 or more and 1.0 or less.

(7) The storing method according to (5) or (6), wherein the food is any of a chocolate confection and edible meat containing lipid in an amount of 1% by mass or more and 50% by mass or less.

Advantageous Effects of Invention

The present invention can provide a multilayer body having excellent oxygen absorbing and capable of sufficiently suppressing an odor, a packaging container in which the multilayer body is used, and a food storing method in which the packaging container is used. Moreover, the present invention can provide a multilayer body capable of highly maintaining the flavor of food by reducing an odor and suppressing permeation of oxygen from outside air when the food is packed and stored, a packaging container in which the multilayer body is used, and a food storing method in which the packaging container is used.

BRIEF DESCRIPTION OF DRAWINGS

FIG. 1 is a partial cross-sectional view schematically showing one example of the multilayer body of the present invention.

FIG. 2 is a partial cross-sectional view schematically showing one example of the packaging container of the present invention.

DESCRIPTION OF EMBODIMENTS

Hereinafter, an embodiment for carrying out the present invention (hereinafter simply referred to as the "present embodiment") will now be described in detail in reference to the drawings as necessary. However, the present invention is not limited to the present embodiment described below. Various modifications to the present invention can be made without departing from the scope of the present invention. In the drawings, the same components are given the same reference numbers, and repetitive descriptions are omitted. The positional relationship such as top, bottom, right, and left is based on the positional relationship shown in the drawings unless specified otherwise. Moreover, the dimensional ratios in the drawings are not limited to the illustrated ratios. Also, in the present specification, the "(meth)acryl" means "acryl" and "methacryl" corresponding thereto.

(Multilayer Body)

FIG. 1 is a partial cross-sectional view schematically showing one example of the multilayer body of the present embodiment. This multilayer body includes a sealing layer (A) containing a thermoplastic resin, an oxygen absorption layer (B) containing a thermoplastic resin and iron powder, and an oxygen barrier layer (D) having oxygen barrier properties, the layers are laminated in this order, and at least one of the sealing layer (A) and the oxygen absorption layer (B) contains an ionomer as the thermoplastic resin.

The oxygen absorbing substance contained in the oxygen absorption layer (B) is iron powder, and therefore unlike the case where the oxygen absorbing substance is an organic macromolecular compound, the oxygen absorbing substance is not degraded even when it absorbs oxygen, and can suppress odor generation and deterioration of the physical strength of the oxygen absorption layer (B). Moreover, in the present embodiment, the sealing layer (A) and/or the oxygen absorption layer (B) contains an ionomer, and it is therefore possible to sufficiently suppress odor generation. As for the principle of suppressing odor generation, the inventors think not that the ionomer absorbs an odor, but rather that the ionomer suppresses odor generation resulting from the contact of, for example, substances in food, in particular oil/fat and fatty acid, with iron powder in the oxygen absorption layer (B). That is to say, the present inventors presume that the ionomer inhibits physical contact of fat/oil and fatty acid with iron powder, and thus odor generation is suppressed. However, factors are not limited thereto. Also, since the multilayer body of the present embodiment includes the sealing layer (A) more toward the outside than the oxygen absorption layer (B) is, the oxygen absorption layer (B) does not come into direct contact with food and dissolve into water, and the deterioration of the flavor of the food resulting from the iron powder contained in that layer can be prevented.

The thickness of the multilayer body is suitably set according to the application thereof, and for example, the multilayer body may be a multilayer film having a thickness of 30 μm or more and 250 μm or less, or may be a multilayer sheet having a thickness of more than 250 μm and 3000 μm or less. More specifically, in the case of using the multilayer body of the present embodiment in, for example, a soft packaging container for storing a chocolate confection as described below, the multilayer body is preferably a multilayer film having a thickness of 30 μm or more and 250 μm or less from the viewpoint that it needs to be thin to maintain flexibility. In the case of using the multilayer body of the present embodiment in a hard packaging container in the form of a blister or a tray for storing edible meat as described below, the multilayer body is preferably a multilayer sheet having a thickness of more than 250 μm and 3000 μm or less from the viewpoint that hardness is required to maintain the specific shape of a blister, a tray, or the like.

(Sealing Layer (A))

The sealing layer (A) according to the present embodiment contains at least a thermoplastic resin. The sealing layer (A) plays a role of a sealant and, in a packaging container in which the multilayer body of the present embodiment is used, can also play a role of separating an accommodated item such as food and the oxygen absorption layer (B) by not allowing them to come into contact. Also, the sealing layer (A) can play a role of efficient oxygen permeation so as not to obstruct rapid oxygen absorption by the oxygen absorption layer (B).

The oxygen permeability of the sealing layer (A) is preferably 1000 cc/(m$^2$·24 h·atm) or more. Accordingly, the rate at which the multilayer body of the present embodiment absorbs oxygen can be further increased. Oxygen permeability is measured under conditions having a measurement temperature of 25° C. and a cell area of 50 cm² using "OX-TRAN-2/21 (manufactured by MOCON Inc.)".

Examples of the thermoplastic resin contained in the sealing layer (A) include polyolefin resins such as polyethylene, an ethylene-α-olefin copolymer, polypropylene, a propylene-ethylene random copolymer, a propylene-ethylene block copolymer, and an ethylene-cycloolefin copolymer, ethylene copolymers such as an ethylene-(meth)acrylic acid copolymer, ethylene-methyl (meth)acrylate, and an ethylene-vinyl acetate copolymer, synthetic rubber resins such as polybutadiene, polyisoprene, and a styrene-butadiene copolymer, and hydrogenated resins thereof, copolymers of soft polyvinyl chloride, polystyrene, polymethylpentene, silicone resin, and polysiloxane with another resin, and ionomers. One thermoplastic resin is used singly, or two or more are used in combination. Among these, from the viewpoint of further increasing the odor generation suppressing effect, the thermoplastic resin preferably contains an ionomer.

The content of the thermoplastic resin in the sealing layer (A) is preferably 70% by mass or more and 100% by mass or less, more preferably 80% by mass or more and 100% by mass or less, and further preferably 90% by mass or more and 100% by mass or less, based on the total amount (100% by mass) of the sealing layer (A). When the content of the thermoplastic resin is within the above range, the sealing layer (A) can play the above roles more effectively and reliably.

The thickness of the sealing layer (A) is preferably 5 μm or more and 500 μm or less, and more preferably 10 μm or more and 250 μm or less. When the thickness of the sealing layer (A) is within the above range, the sealing layer (A) can more effectively and reliably play the roles of further increasing the rate at which the multilayer body absorbs oxygen and separating the accommodated item and the oxygen absorption layer (B) by not allowing them to come into contact.

The sealing layer (A) may contain a material other than the thermoplastic resin as long as the sealing layer (A) is not inhibited from playing the above roles. Examples of such materials include, but are not particularly limited to, fillers such as calcium carbonate, clay, mica, and silica, desiccants, pigments, dyes, antioxidants, slip agents, antistatic agents, stabilizers, and plasticizers. One of these is used singly, or two or more are used in combination.

(Oxygen Absorption Layer (B))

The oxygen absorption layer (B) according to the present embodiment contains a thermoplastic resin and iron powder. The oxygen absorption layer (B) plays a role of absorbing oxygen that would permeate the multilayer body, such as oxygen that would enter from outside air the inside of a packaging container in which the multilayer body of the present embodiment is used, and oxygen that remains in the packaging container.

A known thermoplastic resin can be suitably used, and examples include, but are not particularly limited to, low density polyethylene, intermediate density polyethylene, high density polyethylene, linear low density polyethylene, linear ultra low density polyethylene, polypropylene, poly-1-butene, and poly-4-methyl-1-pentene, or polyolefins such as random or block copolymers of α-olefins such as ethylene, propylene, 1-butene, and 4-methyl-1-pentene, and ionomers, or mixtures thereof. One thermoplastic resin is used singly, or two or more are used in combination. Among these, from the viewpoint of further increasing the odor generation suppressing effect, the thermoplastic resin preferably contains an ionomer.

The content of the thermoplastic resin in the oxygen absorption layer (B) is not particularly limited, and may be 45% by mass or more and 85% by mass or less, may be 50% by mass or more and 80% by mass or less, and may be 55% by mass or more and 75% by mass or less, based on the total amount (100% by mass) of the oxygen absorption layer (B).

Iron powder is not particularly limited as long as the surface of iron is exposed, and iron powder known in the art is suitably used, such as reduced iron powder, electrolytic iron powder, and atomized iron powder. In addition, ground products, machined articles, and the like of cast iron and the like are also usable. One of these is used singly, or two or more are used in combination. Iron powder acquires oxygen absorbability by undergoing a reaction with water that enters the oxygen absorption layer (B).

The average particle size of iron powder is preferably 0.1 μm or more and 200 μm or less, and more preferably 1 μm or more and 50 μm or less. When the average particle size of the iron powder is within the above range, contact with oxygen is better, the oxygen absorbability of the oxygen absorption layer (B) is increased, and also the film formability of the oxygen absorption layer (B) can be further increased. The average particle size of iron powder is measured with a particle size analyzer such as Microtrac MT3000 II (trade name) manufactured by Nikkiso Co., Ltd., laser diffraction particle size distribution analyzer SALD-3000 (trade name) manufactured by Shimadzu Corporation, or the like.

The content of iron powder is not particularly limited, and is preferably 10.0% by mass or more and 60% by mass or less, more preferably 15% by mass or more and 50% by mass or less, and further preferably 20% by mass or more and 40% by mass or less, based on the total amount (100% by mass) of the oxygen absorption layer (B). Accordingly, the oxygen absorbability of the oxygen absorption layer (B) is further increased, also degradation of food-derived oil or the like due to iron powder is further suppressed, and therefore generation of gas that causes a foreign smell can be further reduced.

The oxygen absorption layer (B) may contain a material other than the thermoplastic resin and iron powder as long as the oxygen absorption layer (B) is not inhibited from playing the above role. Examples of such materials include desiccants, adsorbents, antibacterial agents, colorants, and deodorizers. One of these is used singly, or two or more are used in combination.

The desiccant means an agent that absorbs water from air, and examples include silica gel, quicklime (calcium oxide), calcium chloride, phosphorus pentoxide, and aluminum oxide. The adsorbent means an agent that physically fixes atoms, molecules, fine particles, and the like to the surface thereof, and specific examples include activated carbon, zeolite, silica gel, and aluminum oxide. In particular, silica gel and aluminum oxide also function as desiccants and are thus preferable. When the oxygen absorption layer (B) contains a desiccant and an adsorbent, the contents thereof are preferably smaller than that of iron powder (for example, more than 0.0% and less than 5.0% based on the total amount of the oxygen absorption layer (B)). The desiccant and the adsorbent normally have water absorbability, and therefore by configuring the contents thereof to be smaller than that of iron powder, the reactivity of iron powder with water can be increased.

The thickness of the oxygen absorption layer (B) is not particularly limited, and is preferably 10 μm or more and 100 μm or less, and more preferably 20 μm or more and 75 μm or less. Accordingly, the rate at which the multilayer body absorbs oxygen can be further increased, and also deterioration of the flexibility of the multilayer body can be prevented.

(Ionomer)

In the multilayer body of the present embodiment, at least one of the sealing layer (A) and the oxygen absorption layer (B) contains an ionomer as a thermoplastic resin. The ionomer is not particularly limited and, from the viewpoint of more effectively and reliably demonstrating the action and effect provided by the present invention, is preferably an ionomer of a copolymer of ethylene and an unsaturated carboxylic acid, and an ionomer of a copolymer of ethylene, an unsaturated carboxylic acid, and an unsaturated carboxylic acid ester.

From the same viewpoint as above, the unsaturated carboxylic acid is preferably an $\alpha,\beta$-unsaturated carboxylic acid, specific examples include acrylic acid, methacrylic acid, and maleic acid, and methacrylic acid is more preferable. Also, from the same viewpoint as above, the unsaturated carboxylic acid ester is preferably an $\alpha,\beta$-unsaturated carboxylic acid ester, specific examples include acrylic acid ester, methacrylic acid ester, and maleic acid ester, and methacrylic acid ester is more preferable. From the same viewpoint as above, the alcohol component that constitutes the ester is preferably a linear or branched alcohol having 1 to 10 carbon atoms, and specific examples include methanol, ethanol, isopropanol, n-propanol, isobutanol, n-butanol, sec-butanol, n-hexanol, n-octanol, 2-ethylhexanol, and n-decanol.

More specific examples of the unsaturated carboxylic acid ester include methyl (meth)acrylate, ethyl (meth)acrylate, isobutyl (meth)acrylate, n-butyl (meth)acrylate, 2-ethylhexyl (meth)acrylate, phenyl (meth)acrylate, and dimethyl maleate.

In the copolymer of ethylene and an unsaturated carboxylic acid, the content ratio of the constitutional unit derived from ethylene is preferably 20% by mass or more and 99% by mass or less, and more preferably 30% by mass or more and 97% by mass or less, and the content ratio of the constitutional unit derived from (meth)acrylic acid is preferably 1% by mass or more and 80% by mass or less, and more preferably 3% by mass or more and 70% by mass or less, based on the copolymer (100% by mass).

In the copolymer of ethylene, an unsaturated carboxylic acid, and an unsaturated carboxylic acid ester, the content ratio of the constitutional unit derived from ethylene is preferably 20% by mass or more and 98% by mass or less, and more preferably 25% by mass or more and 94% by mass or less, the content ratio of the constitutional unit derived from the unsaturated carboxylic acid is preferably 1% by mass or more and 80% by mass or less, and more preferably 3% by mass or more and 70% by mass or less, and the content ratio of the constitutional unit derived from the (meth)acrylic acid ester is preferably 1% by mass or more and 80% by mass or less, and more preferably 3% by mass or more and 75% by mass or less, based on the copolymer (100% by mass).

In the ionomer of a copolymer of ethylene and (meth) acrylic acid and the ionomer of a copolymer of ethylene, an unsaturated carboxylic acid, and an unsaturated carboxylic acid ester, some or all of the carboxyl groups thereof are neutralized with metal ions. The degree of neutralization may be, for example, 0.1 mol % or more, and is preferably 1 mol % or more, and more preferably 10 mol % or more.

Examples of the metal species of the metal ions include lithium, sodium, potassium, calcium, magnesium, zinc, cobalt, nickel, manganese, lead, copper, titanium, iron, aluminum, and zirconium. Among these, from the viewpoint of more effectively and reliably demonstrating the action and effect provided by the present invention, metal species selected from the group consisting of elements in Group 1 and Group 12 of the periodic table are preferable, sodium, potassium, and zinc are more preferable, sodium and zinc are further preferable, and sodium is particularly preferable. In addition to metal ions, amino compounds may be contained that are represented by ammonia, methylamine, dimethylamine, trimethylamine, ethylamine, diethylamine, triethylamine, ethylenediamine, diethylenetriamine, triethylenetetramine, 1,3-dimethylaminocyclohexane, and the like. One of these may be used singly, or two or more may be used in combination.

The ionomer preferably has a melt flow rate (MFR) of 0.01 g/10 min or more and 1000 g/10 min or less and more preferably 0.1 g/10 min or more and 100 g/10 min or less at 190° C. under a load of 2160 g.

Of the content of the ionomer in the thermoplastic resin contained in the sealing layer (A) and/or the oxygen absorption layer (B), the content of the ionomer in the sealing layer (A) is preferably 10% by mass or more and 100% by mass or less, and more preferably 20% by mass or more and 90% by mass or less, based on the total amount (100% by mass) of the sealing layer (A). The content of the ionomer in the oxygen absorption layer (B) is preferably 10% by mass or more and 90% by mass or less, and more preferably 20% by mass or more and 90% by mass or less, based on the total amount (100% by mass) of the oxygen absorption layer (B). When the ionomer contents in the respective layers are at the above lower limits or more, there is a tendency that the physical contact of food-derived oil/fat and fatty acid with iron powder is inhibited, and the odor generation suppressing effect of the ionomers presumed as suppressing odor generation is further increased. The ratio ((B)/(A)) of the thickness of the oxygen absorption layer (B) to the thickness of the sealing layer (A) is preferably 0.02 or more and 20 or less, and more preferably 0.08 or more and 7.5 or less.

(Oxygen Barrier Layer (D))

The oxygen barrier layer (D) is a layer having oxygen barrier properties and, for example, by containing an oxygen barrier substance, can attain the oxygen barrier properties thereof. The oxygen barrier substance means a substance having an oxygen permeability of 100 cc/(m$^2$·24 h·atm) or less. Examples of oxygen barrier substances that can be contained in the oxygen barrier layer (D) include polyester (such as polyethylene terephthalate), polyamide, Nylon MXD6, an ethylene-vinyl alcohol copolymer, and vinylidene chloride on which silica or alumina is vapor-deposited. The oxygen barrier layer (D) may be metal foil such as aluminum foil. The thickness of the oxygen barrier layer (D) is preferably 1 μm or more and 300 μm or less, and more preferably 1 μm or more and 100 μm or less. When the thickness of the oxygen barrier layer (D) is within the above range, the oxygen barrier effect can be further increased, and deterioration of flexibility can be prevented. As for a method for measuring oxygen permeability, the method exemplified as a method for measuring the oxygen permeability of the sealing layer (A) can be used.

(Odor Absorption Layer (C))

It is preferable that the multilayer body of the present embodiment further includes an odor absorption layer (C) containing a thermoplastic resin and an inorganic base between the oxygen absorption layer (B) and the oxygen barrier layer (D). The odor absorption layer (C) plays a role of absorbing an odor that comes into contact with the multilayer body. In a packaging container in which the multilayer body of the present embodiment is used, an odor generated from an accommodated item such as food can be absorbed. When such a multilayer body is used, water released from food comes into contact with the oxygen absorption layer (B) before coming into contact with the odor absorption layer (C) even when the odor absorption layer (C) is provided, therefore the amount of water supplied to the oxygen absorption layer (B) is not reduced and, as a result, a reduction of the amount of oxygen absorbed and a decrease of the rate of oxygen absorbed can be prevented. Moreover, since the multilayer body including the odor absorption layer (C) in the above-described manner has the sealing layer (A) more toward the outside than the odor absorption layer (C) containing an inorganic base is, the odor absorption layer (C) containing an inorganic base does not directly come into contact with food and dissolve into water, and deterioration of the flavor of the food resulting from the inorganic base contained in that layer can be prevented.

A known thermoplastic resin can be suitably used, and examples include, but are not particularly limited to, low density polyethylene, intermediate density polyethylene, high density polyethylene, linear low density polyethylene, linear ultra low density polyethylene, polypropylene, poly-1-butene, and poly-4-methyl-1-pentene, or polyolefins such as random or block copolymers of α-olefins such as ethylene, propylene, 1-butene, and 4-methyl-1-pentene, or mixtures thereof. One thermoplastic resin is used singly, or two or more are used in combination.

The content of the thermoplastic resin in the odor absorption layer (C) is not particularly limited, and may be 70% by mass or more and 98% by mass or less, may be 75% by mass or more and 98% by mass or less, and may be 80% by mass or more and 95% by mass or less, based on the total amount (100% by mass) of the odor absorption layer (C).

The inorganic base is an inorganic compound that exhibits basicity, and absorbs an odor-causing gas. Examples of the inorganic base include hydroxides, carbonates, hydrogencarbonates, and oxides of metals in Group 1 and Group 2 of the periodic table. More specific examples include lithium hydroxide, sodium hydroxide, potassium hydroxide, rubidium hydroxide, cesium hydroxide, calcium hydroxide, strontium hydroxide, barium hydroxide, magnesium hydroxide, sodium carbonate, potassium carbonate, calcium carbonate, magnesium carbonate, sodium hydrogencarbonate, potassium hydrogencarbonate, calcium hydrogencarbonate, calcium oxide, and magnesium oxide. Among these, from the viewpoint of more effectively and reliably demonstrating the action and effect provided by the present invention, an inorganic base having a metal in Group 2 of the periodic table is preferable, an inorganic base having calcium or magnesium is more preferable, an inorganic base having calcium is further preferable, one or more inorganic bases selected from the group consisting of calcium oxide, calcium hydroxide, calcium oxide, and calcium hydroxide are furthermore preferable, and one or more inorganic bases selected from the group consisting of calcium oxide and calcium hydroxide are particularly preferable.

The average particle diameter of the inorganic base is preferably 0.1 μm or more and 200 μm or less, and more preferably 1 μm or more and 50 μm or less. When the average particle size of the inorganic base is within the above range, contact with an odor is better, the odor absorbability of the odor absorption layer (C) is increased, and also the film formability of the odor absorption layer (C) can be further increased. The average particle size of the inorganic base is measured with a particle size analyzer such as Microtrac MT3000 II (trade name) manufactured by Nikkiso Co., Ltd., laser diffraction particle size distribution analyzer SALD-3000 (trade name) manufactured by Shimadzu Corporation, or the like.

The content of the inorganic base in the odor absorption layer (C) is preferably 0.10% by mass or more and 20.0% by mass or less, more preferably 0.50% by mass or more and 17.0% by mass or less, and further preferably 1.0% by mass or more and 15.0% by mass or less, based on the total amount (100% by mass) of the odor absorption layer (C). When the content of the inorganic base is within the above range, the odor absorbability of the odor absorption layer (C) is further increased, and also a decrease of the oxygen absorbability of the oxygen absorption layer (B) associated with the absorption of water by the odor absorption layer (C) can be further suppressed.

The odor absorption layer (C) may contain a material other than the thermoplastic resin and the inorganic base as long as the odor absorption layer (C) is not inhibited from playing the above role. Examples of such materials include desiccants, adsorbents, antibacterial agents, colorants, and deodorizers (except for those regarded as inorganic bases). One of these is used singly, or two or more are used in combination. Examples of desiccants and adsorbents are as those described above. When the odor absorption layer (C) contains a desiccant and an adsorbent, the contents thereof are preferably smaller than that of the inorganic base. Accordingly, it is possible to further suppress the creation of a site where the inorganic base is not present in the odor absorption layer (C) due to the uneven distribution of the inorganic base in the odor absorption layer (C).

The thickness of the odor absorption layer (C) is not particularly limited, and is preferably 1 μm or more and 300 μm or less, and more preferably 10 μm or more and 200 μm or less. Accordingly, the odor absorbability of the multilayer body can be further increased, and also deterioration of the flexibility of the multilayer body can be prevented.

(Other Layers)

In addition to the sealing layer (A), the oxygen absorption layer (B), the oxygen barrier layer (D), and the optional odor absorption layer (C), the multilayer body of the present embodiment may include another layer as long as it does not inhibit the present invention from achieving the objects. Examples of such layers include an adhesive layer, a light-shielding layer, a peelable layer, and a tearable layer.

For example, from the viewpoint of further increasing adhesion between two adjacent layers, the multilayer body of the present embodiment may include an adhesive layer between the two layers. The adhesive layer preferably contains a thermoplastic resin that has adhesion. Examples of the thermoplastic resin that has adhesion include acid-modified polyolefin resins obtained by modifying a polyolefin resin such as polyethylene or polypropylene with an unsaturated carboxylic acid such as acrylic acid, methacrylic acid, maleic acid, maleic anhydride, fumaric acid, or itaconic acid; and polyester thermoplastic elastomers containing a polyester block copolymer as a main component. The thickness of the adhesive layer is not particularly limited and, from the viewpoint of demonstrating practical adhesive strength and ensuring molding processability, is preferably 2 μm or more and 100 μm or less.

From the viewpoint of further enhancing the light-shielding properties, the multilayer body of the present embodiment may include a light-shielding layer on the opposite side of the oxygen barrier layer (D) from the oxygen absorption layer (B) especially in the case of using a metal-free layer as the oxygen barrier layer (D). Examples of the light-shielding layer include metal foil and vapor-deposited film. Here, the metal foil is not particularly limited, and is preferably aluminum foil. From the viewpoint of light-shielding properties, flex resistance, and the like, the thickness of the metal foil is preferably 3 μm or more and 50 μm or less, more preferably 3 μm or more and 30 μm or less, and further preferably 5 μm or more and 15 μm or less. The vapor-deposited film is not particularly limited and, for example, is a resin film on which a membrane of a metal such as aluminum or alumina or a metal compound such as a metal oxide is vapor-deposited. Examples of methods for forming a vapor-deposited film include methods wherein a metal or a metal compound is vapor-deposited on a resin film by a physical vapor deposition method such as a vacuum deposition method, a sputtering method, or an ion plating method, a chemical vapor deposition method such as PECVD, or the like. From the viewpoint of light-shielding properties, flex resistance, and the like, the thickness of the vapor-deposited film is preferably 5 nm or more and 500 nm or less, and more preferably 5 nm or more and 200 nm or less.

Moreover, in the case of using the multilayer body of the present embodiment as a packaging container or the like described below, the multilayer body may include a peelable layer or a tearable layer to facilitate the opening of the packaging container. As a peelable layer, for example, a film obtained by blending two or more different polyolefins to control seal strength and peel strength is generally known. As a tearable layer, for example, a tearable film obtained by blending Nylon 6 with Nylon MXD6 is generally known.

(Method for Producing Multilayer Body)

The multilayer body of the present embodiment can be produced by, for example, co-extruding with a multilayer film manufacturing apparatus a laminate having a multilayer structure obtained by laminating a resin composition containing the materials of the sealing layer (A), a resin composition containing the materials of the oxygen absorption layer (B), and a composition containing the materials of the oxygen barrier layer (D) in this order. Alternatively, it is also possible that a laminate having a multilayer structure obtained by laminating a resin composition containing the materials of the sealing layer (A) and a resin composition containing the materials of the oxygen absorption layer (B) in this order is co-extruded with a multilayer film manufacturing apparatus, and then the oxygen barrier layer (D) is adhered to the oxygen absorption layer (B) with an adhesive. A multilayer body including the odor absorption layer (C) between the oxygen absorption layer (B) and the oxygen barrier layer (D) can be produced by, for example, co-extruding with a multilayer film manufacturing apparatus a laminate having a multilayer structure obtained by laminating a resin composition containing the materials of the sealing layer (A), a resin composition containing the materials of the oxygen absorption layer (B), a resin composition containing the materials of the odor absorption layer (C), and a composition containing the materials of the oxygen barrier layer (D) in this order. Alternatively, it is also possible that a laminate having a multilayer structure obtained by laminating a resin composition containing the materials of the sealing layer (A), a resin composition containing the materials of the oxygen absorption layer (B), and a resin composition containing the materials of the odor absorption layer (C) is produced by co-extrusion with a multilayer film manufacturing apparatus, and then the oxygen barrier layer (D) is adhered to the odor absorption layer (C) with an adhesive. Also, in co-extrusion, an adhesive layer may be provided between the layers as necessary.

(Packaging Container)

The multilayer body of the present embodiment can be used as a part of or the entirety of a packaging container such as a packaging bag as an oxygen scavenging packaging material. FIG. 2 is a partial cross-sectional view showing one example of an oxygen scavenging packaging container according to the present embodiment, and shows an example wherein a multilayer body including the odor absorption layer (C) between the oxygen absorption layer (B) and the oxygen barrier layer (D) of the multilayer body shown in FIG. 1 is used. A packaging container 100 shown in FIG. 2 includes two multilayer bodies 10. Two multilayer bodies 10 are attached to each other, with the respective sealing layers (A) being on the inside. The packaging container 100 can be produced by, for example, heat-sealing the edges of the respective multilayer bodies 10. This packaging container 100 has the sealing layers (A) on the inside (i.e., on the side where the packaging container comes into contact with an accommodated item), and the oxygen barrier layers (D) on the outside (i.e., on the side where the packaging container comes into direct contact with outside air). The packaging container of the present embodiment is not limited to the packaging container 100 shown in FIG. 2 as long as the sealing layer (A) is on the inside and the oxygen barrier layer (D) is on the outside. While the packaging container 100 shown in FIG. 2 represents an example wherein the multilayer body is used as the entirety of the packaging container, the multilayer body may be used as a part of a packaging container, such as a lid of a container or only one side of a pouch.

Moreover, the multilayer body of the present embodiment can be used as an oxygen scavenger formed into a sheet or a film, or as an oxygen scavenger package body in a form obtained by placing it in an air-permeable sachet. Also, the multilayer body of the present embodiment can be molded into label, card, packing, and like forms and used as an oxygen scavenging body.

Applications of the multilayer body of the present embodiment are not limited, and the multilayer body demonstrates highly practical oxygen scavenging performance and odor absorbability in the field of storage and quality retention of foods, beverages, pharmaceuticals, medical supplies, cosmetics, metal products, electronic products, and the like. In the field of food storage among these, the multilayer body can demonstrate effectively high oxygen scavenging performance and odor absorbability in particular.

(Food Storing Method)

The food storing method of the present embodiment is a method wherein food is packed and stored in the packaging container of the present embodiment. In the present embodiment, absorption of oxygen (oxygen scavenging) is carried out by iron powder reacted with water in the oxygen absorption layer (B), and therefore it is preferable that the food contains a predetermined amount of water. Specifically, the food preferably has a water activity (Aw) of 0.3 or more and 1.0 or less. Here, the water activity is a measure of the content of free water in an article and expressed as a numerical value of 0.0 or more and 1.0 or less. A water-free article has 0.0, and pure water has 1.0. That is to say, the water activity (Aw) of a given article is defined by the following formula where P is the water vapor pressure in a space after the article is hermetically sealed and an equilibrium is reached, P0 is the water vapor pressure of pure water, and RH (%) is the relative humidity in the same space:

$$Aw = P/P0 = RH/100$$

In the food storing method of the present embodiment, examples of the food to be stored include water-containing foods represented by confections such as chocolate confections, jelly with fruit flesh, yokan (sweet bean paste), and pudding; fruits such as pineapples, oranges, peaches, apricots, pears, and apples; vegetables such as lettuces, radishes, and cucumbers; edible meat such as beef, pork, and chicken; seasonings such as liquid broth, mayonnaise, miso (fermented soybean paste), and grated spices; pasty foods such as jam, cream, and chocolate paste; liquid foods represented by liquid processed foods such as curry, liquid soup, simmered foods, pickles, and stew; beverages represented by drinking water, tea drinks, coffee drinks, soft drinks, alcoholic drinks, and milk; uncooked noodles and boiled noodles such as soba (buckwheat noodles), udon (wheat-flour noodles), and ramen noodles; uncooked rice such as milled rice, humidity-controlled rice, and no-wash rice, and cooked rice; processed rice products such as gomoku-meshi (Japanese pilaf), red rice, and rice gruel; and powdered seasonings such as powdered soup and soup stock powder.

Among these, a food that contains lipid in an amount of 1% by mass or more and 50% by mass or less is preferable. In addition to being likely to be deteriorated by oxygen, such a food is likely to generate an odor. Moreover, the generated odor is more effectively and reliably absorbed with the multilayer body of the present embodiment as a packaging container or the like. More specific examples of such foods include chocolate confections containing lipid in an amount of 1% by mass or more and 50% by mass or less and edible meat (such as beef) containing lipid in an amount of 1% by mass or more and 50% by mass or less. In the case of the above chocolate confection, the packaging container of the present embodiment or the like is particularly useful when storing it at normal temperature, and in the case of edible meat, the packaging container of the present embodiment or the like is particularly useful when storing it under refrigerated conditions (such as 5° C. or higher and 10° C. or lower).

EXAMPLES

Hereinafter, the present invention will now be described in more detail by way of Examples, but the present invention is not limited to these Examples.

(Multilayer Body Evaluation Method 1)

A packaging container in the form of a bag as shown in FIG. 2 was prepared from a multilayer body. Then, a chocolate confection containing chocolate, sponge cake, and fresh cream was accommodated in the packaging container together with air and then sealed. The packaging container containing the chocolate confection was stored at 25° C. for 7 days in the dark. Thereafter, the packaging container was opened, the chocolate confection was taken out, and a chocolate part of the chocolate confection was placed in the mouth to check the flavor at that time. A case where the aroma and the taste were both good when the chocolate confection was placed in the mouth, i.e., a case where a change from before storage was barely recognizable, was evaluated as "−"; a case where the chocolate taste was retained, but the aroma of chocolate was weakened, and a foreign smell reminiscent of almond was noticeable was evaluated as "+"; a case where there were chocolate flavors (aroma and taste) but they were both weakened was evaluated as "++"; and a case where there was a taste different from chocolate was evaluated as "+++".

(Multilayer Body Evaluation Method 2)

A packaging container in the form of a bag as shown in FIG. 2 was prepared from a multilayer body. Thereafter, a chocolate confection containing chocolate, sponge cake, and fresh cream was accommodated in the packaging container together with air and then sealed. The packaging container containing the chocolate confection was stored at 25° C. for 7 days in the dark. From the opening of the stored packaging container, gas in the packaging container was collected with a syringe, and the oxygen concentration (%) was measured using an oxygen concentration analyzer (trade name "CheckMate 2" manufactured by Dansensor).

Example 1

67.5 parts by mass of polyethylene (trade name "Novatec LD: LC8001" manufactured by Japan Polyethylene Corporation), 30.0 parts by mass of iron powder (trade name "sponge iron powder" manufactured by Höganäs Japan, average particle size 30 μm), and 2.5 parts by mass of calcium oxide (manufactured by Calfine Co., Ltd., average particle size 5 μm) were melt-kneaded at 200° C. using a biaxial kneader-extruder having two screws each having a diameter of 37 mm, strands were extruded from the extruder head, cooled, and then pelletized, and thereby a resin composition (b1) for an oxygen absorption layer (B1) was obtained.

Also, 94.2 parts by mass of polyethylene (trade name "Novatec LD: LC606" manufactured by Japan Polyethylene Corporation) and 5.9 parts by mass of calcium oxide (manufactured by Calfine Co., Ltd., average particle size 5 μm) were melt-kneaded at 200° C. using the above biaxial kneader-extruder, strands were extruded from the extruder head, cooled, and then pelletized, and thereby a resin composition (c1) for an odor absorption layer (C1) was obtained.

Then, using a three-layer multilayer sheet molding apparatus equipped with first to third extruders, a feed block, a T-die, a chill roll, and a sheet take-up unit, an ionomer for a sealing layer (A1) (an ionomer of a copolymer of ethylene and methacrylic acid, the metal species of metal ions: sodium, trade name "Himilan 1601" manufactured by Du Pont-Mitsui Polychemicals Co., Ltd.) was extruded from the first extruder, the resin composition (b1) was extruded from the second extruder, and polyethylene (trade name "Novatec LD: LC606" manufactured by Japan Polyethylene Corporation) was extruded from the third extruder, respectively, and a three-layer film was obtained through the feed block. The layer configuration of the three-layer film was, from the inner layer, sealing layer (A1) (thickness 20 μm)/oxygen absorption layer (B1) (thickness 45 μm)/polyethylene layer (PE) (thickness 23 μm). An oxygen barrier layer (D) that had a thickness of 12 μm and was composed of silica-deposited polyethylene terephthalate (trade name "Barrierlocks" manufactured by Toray Advanced Film Co., Ltd.) was adhered to the polyethylene layer (PE) side of the obtained three-layer film by dry lamination, with the silica-deposited surface being the adhered surface, and thereby a multilayer body was obtained.

The obtained multilayer body was evaluated by the above "multilayer body evaluation method 1" and "multilayer body evaluation method 2". Results are shown in Table 1 together with the configuration of the multilayer body.

Example 2

67.5 parts by mass of an ionomer (an ionomer of a copolymer of ethylene and methacrylic acid, the metal species of metal ions: sodium, trade name "Himilan 1601"

manufactured by Du Pont-Mitsui Polychemicals Co., Ltd.), 30.0 parts by mass of iron powder (trade name "sponge iron powder" manufactured by Höganäs Japan, average particle size 30 μm), and 2.5 parts by mass of calcium oxide (manufactured by Calfine Co., Ltd., average particle size 5 μm) were melt-kneaded at 200° C. using a biaxial kneader-extruder having two screws each having a diameter of 37 mm, strands were extruded from the extruder head, cooled, and then pelletized, and thereby a resin composition (b2) for an oxygen absorption layer (B2) was obtained. Except that polyethylene for a sealing layer (A2) (trade name "Sumikathene L705" manufactured by Sumitomo Chemical Co., Ltd.) was used in place of the ionomer for the sealing layer (A1) (an ionomer of a copolymer of ethylene and methacrylic acid, the metal species of metal ions: sodium, trade name "Himilan 1601" manufactured by Du Pont-Mitsui Polychemicals Co., Ltd.) and the resin composition (b2) was used in place of the resin composition (b1), a multilayer body including the sealing layer (A2) in place of the sealing layer (A1) and the oxygen absorption layer (B2) in place of the oxygen absorption layer (B1) was obtained in the same manner as in Example 1. The obtained multilayer body was evaluated by the above "multilayer body evaluation method 1" and "multilayer body evaluation method 2". Results are shown in Table 1 together with the configuration of the multilayer body.

Example 3

88.3 parts by mass of polyethylene (trade name "Novatec LD: LC606" manufactured by Japan Polyethylene Corporation) and 11.7 parts by mass of calcium oxide (manufactured by Calfine Co., Ltd., average particle size 5 μm) were melt-kneaded at 200° C. using the above biaxial kneader-extruder, strands were extruded from the extruder head, cooled, and then pelletized, and thereby a resin composition (c3) for an odor absorption layer (C3) was obtained. Except that the resin composition (c3) was used in place of polyethylene for the polyethylene layer (PE) (trade name "Novatec LD: LC606" manufactured by Japan Polyethylene Corporation), a multilayer body including the odor absorption layer (C3) in place of the polyethylene layer (PE) was obtained in the same manner as in Example 1. The obtained multilayer body was evaluated by the above "multilayer body evaluation method 1" and "multilayer body evaluation method 2". Results are shown in Table 1 together with the configuration of the multilayer body.

Example 4

Except that the resin composition (c3) was used in place of polyethylene for the polyethylene layer (PE) (trade name "Novatec LD: L0606" manufactured by Japan Polyethylene Corporation), a multilayer body including the odor absorption layer (C3) in place of the polyethylene layer (PE) was obtained in the same manner as in Example 2. The obtained multilayer body was evaluated by the above "multilayer body evaluation method 1" and "multilayer body evaluation method 2". Results are shown in Table 1 together with the configuration of the multilayer body.

Comparative Example 1

Except that polyethylene for the sealing layer (A2) (trade name "Sumikathene L705" manufactured by Sumitomo Chemical Co., Ltd.) was used in place of the ionomer for the sealing layer (A1) (an ionomer of a copolymer of ethylene and methacrylic acid, the metal species of metal ions: sodium, trade name "Himilan 1601" manufactured by Du Pont-Mitsui Polychemicals Co., Ltd.), a multilayer body including the sealing layer (A2) in place of the sealing layer (A1) was obtained in the same manner as in Example 1. The obtained multilayer body was evaluated by the above "multilayer body evaluation method 1" and "multilayer body evaluation method 2". Results are shown in Table 1 together with the configuration of the multilayer body.

Comparative Example 2

64.6 parts by mass of polyethylene (trade name "Novatec LD: LC8001" manufactured by Japan Polyethylene Corporation), 30.0 parts by mass of iron powder (trade name "sponge iron powder" manufactured by Höganäs Japan, average particle size 30 μm), and 5.4 parts by mass of calcium oxide (manufactured by Calfine Co., Ltd., average particle size 5 μm) were melt-kneaded at 200° C. using the above biaxial kneader-extruder, strands were extruded from the extruder head, cooled, and then pelletized, and thereby a resin composition (e2) was obtained. Except that the resin composition (e2) was used in place of the resin composition (b2) for the oxygen absorption layer (B2), a multilayer body including a layer (E2) in place of the oxygen absorption layer (B2) was obtained in the same manner as in Example 2. The obtained multilayer body was evaluated by the above "multilayer body evaluation method 1" and "multilayer body evaluation method 2". Results are shown in Table 1 together with the configuration of the multilayer body.

Comparative Example 3

66.3 parts by mass of polyethylene (trade name "Novatec LD: LC8001" manufactured by Japan Polyethylene Corporation), 30.0 parts by mass of iron powder (trade name "sponge iron powder" manufactured by Höganäs Japan, average particle size 30 μm), 2.5 parts by mass of calcium oxide (manufactured by Calfine Co., Ltd., average particle size 5 μm), and 1.3 parts by mass of silica gel (trade name "Sylysia 710" manufactured by Fuji Silysia Chemical Ltd.) were melt-kneaded at 200° C. using the above biaxial kneader-extruder, strands were extruded from the extruder head, cooled, and then pelletized, and thereby a resin composition (e3) was obtained. Except that the resin composition (e3) was used in place of the resin composition (b2) for the oxygen absorption layer (B2), a multilayer body including a layer (E3) in place of the oxygen absorption layer (B2) was obtained in the same manner as in Example 2. The obtained multilayer body was evaluated by the above "multilayer body evaluation method 1" and "multilayer body evaluation method 2". Results are shown in Table 1 together with the configuration of the multilayer body.

Comparative Example 4

95.5 parts by mass of polyethylene (trade name "Novatec LD: LC606" manufactured by Japan Polyethylene Corporation) and 4.5 parts by mass of silica gel (trade name "Sylysia 710" manufactured by Fuji Silysia Chemical Ltd.) were melt-kneaded at 200° C. using the above biaxial kneader-extruder, strands were extruded from the extruder head, cooled, and then pelletized, and thereby a resin composition (e4) was obtained. Except that the resin composition (e4) was used in place of polyethylene for the polyethylene layer (PE) (trade name "Novatec LD: LC606" manufactured by Japan Polyethylene Corporation), a multilayer body including an layer (E4) in place of the polyethylene layer (PE) was obtained in the same manner as in Example 2. The obtained multilayer body was evaluated by the above "multilayer body evaluation method 1" and "multilayer body evaluation method 2". Results are shown in Table 1 together with the configuration of the multilayer body.

Comparative Example 5

91.0 parts by mass of polyethylene (trade name "Novatec LD: LC606" manufactured by Japan Polyethylene Corporation) and 9.0 parts by mass of silica gel (trade name "Sylysia 710" manufactured by Fuji Silysia Chemical Ltd.) were melt-kneaded at 200° C. using the above biaxial kneader-extruder, strands were extruded from the extruder head, cooled, and then pelletized, and thereby a resin composition (e5) was obtained. Except that polyethylene for the sealing layer (A2) (trade name "Sumikathene L705" manufactured by Sumitomo Chemical Co., Ltd.) was used in place of the ionomer for the sealing layer (A1) (an ionomer of a copolymer of ethylene and methacrylic acid, the metal species of metal ions: sodium, trade name "Himilan 1601" manufactured by Du Pont-Mitsui Polychemicals Co., Ltd.) and the resin composition (e5) was used in place of polyethylene for the polyethylene layer (PE) (trade name "Novatec LD: LC606" manufactured by Japan Polyethylene Corporation), a multilayer body including the sealing layer (A2) in place of the sealing layer (A1) and an layer (E5) in place of the polyethylene layer (PE) was obtained in the same manner as in Example 1. The obtained multilayer body was evaluated by the above "multilayer body evaluation method 1" and "multilayer body evaluation method 2". Results are shown in Table 1 together with the configuration of the multilayer body.

Comparative Example 6

97.1 parts by mass of polyethylene (trade name "Novatec LD: LC606" manufactured by Japan Polyethylene Corporation) and 2.9 parts by mass of calcium oxide (manufactured by Calfine Co., Ltd., average particle size 5 μm) were melt-kneaded at 200° C. using the above biaxial kneader-extruder, strands were extruded from the extruder head, cooled, and then pelletized, and thereby a resin composition (c6) for an odor absorption layer (C6) was obtained.

Then, a three-layer film was obtained in the same manner as in Example 2 except that the resin composition (c6) was extruded from the second extruder and the resin composition (b1) was extruded from the third extruder. The layer configuration of the three-layer film was, from the inner layer, sealing layer (A2) (thickness 20 μm)/odor absorption layer (C6) (thickness 23 μm)/oxygen absorption layer (B1) (thickness 45 μm). An oxygen barrier layer (D) that had a thickness of 12 μm and was composed of silica-deposited polyethylene terephthalate (trade name "Barrierlocks" manufactured by Toray Advanced Film Co., Ltd.) was adhered to the oxygen absorption layer (B1) side of the obtained three-layer film by dry lamination, with the silica-deposited surface being the adhered surface, and thereby a multilayer body was obtained.

The obtained multilayer body was evaluated by the above "multilayer body evaluation method 1" and "multilayer body evaluation method 2". Results are shown in Table 1 together with the configuration of the multilayer body.

Comparative Example 7

Except that polyethylene for the sealing layer (A2) (trade name "Sumikathene L705" manufactured by Sumitomo Chemical Co., Ltd.) was used in place of the ionomer for the sealing layer (A1) (an ionomer of a copolymer of ethylene and methacrylic acid, the metal species of metal ions: sodium, trade name "Himilan 1601" manufactured by Du Pont-Mitsui Polychemicals Co., Ltd.) and an oxidizable thermoplastic resin (trade name "Cryovac® OS Films" manufactured by Sealed Air) was used in place of the resin composition (b1) for the oxygen absorption layer (B1), a multilayer body including the sealing layer (A2) in place of the sealing layer (A1) and an oxidizable thermoplastic resin layer (EO) in place of the oxygen absorption layer (B1) was obtained in the same manner as in Example 3. The obtained multilayer body was evaluated by the above "multilayer body evaluation method 1" and "multilayer body evaluation method 2". Results are shown in Table 1 together with the configuration of the multilayer body.

TABLE 1

| Example No. | First layer Thickness (μm) | First layer Layer type | Second layer Thickness (μm) | Second layer Layer type | Third layer Thickness (μm) | Third layer Layer type | Fourth layer Thickness (μm) | Fourth layer Layer type | Multilayer body evaluation method Evaluation method (1) | Multilayer body evaluation method Evaluation method (2) |
|---|---|---|---|---|---|---|---|---|---|---|
| Example 1 | 20 | (A1) | 45 | (B1) | 23 | (PE) | 12 | (D) | − | 0.1 |
| Example 2 | 20 | (A2) | 45 | (B2) | 23 | (PE) | 12 | (D) | − | 0.1 |
| Example 3 | 20 | (A1) | 45 | (B1) | 23 | (C3) | 12 | (D) | − | 0.1 |
| Example 4 | 20 | (A2) | 45 | (B2) | 23 | (C3) | 12 | (D) | − | 0.1 |
| Comparative Example 1 | 20 | (A2) | 45 | (B1) | 23 | (PE) | 12 | (D) | +++ | 0.1 |
| Comparative Example 2 | 20 | (A2) | 45 | (E2) | 23 | (PE) | 12 | (D) | + | 1 |
| Comparative Example 3 | 20 | (A2) | 45 | (E3) | 23 | (PE) | 12 | (D) | + | 0.1 |
| Comparative Example 4 | 20 | (A2) | 45 | (B1) | 23 | (E4) | 12 | (D) | ++ | 0.1 |
| Comparative Example 5 | 20 | (A2) | 45 | (B1) | 23 | (E5) | 12 | (D) | ++ | 0.1 |
| Comparative Example 6 | 20 | (A2) | 23 | (C6) | 45 | (B1) | 12 | (D) | + | 2 |
| Comparative Example 7 | 20 | (A2) | 45 | (EO) | 23 | (C3) | 12 | (D) | +++ | 0.1 |

The present application is based on a Japanese patent application (Japanese Patent Application No. 2016-239658) filed on Dec. 9, 2016, the contents of which are incorporated herein by reference.

INDUSTRIAL APPLICABILITY

The present invention can provide a multilayer body having excellent oxygen absorbing and capable of sufficiently suppressing an odor, a packaging container in which the multilayer body is used, and a food storing method in which the packaging container is used. Moreover, the present invention can provide a multilayer body capable of highly maintaining the flavor of food by reducing an odor and suppressing permeation of oxygen from outside air when the food is packed and stored, a packaging container in which the multilayer body is used, and a food storing method in which the packaging container is used. Therefore, the present invention has industrial applicability in fields where such effects are required, such as food packaging.

REFERENCE SIGNS LIST (A) Sealing layer
(B) Oxygen absorption layer
(C) Odor absorption layer
(D) Oxygen barrier layer
10 Multilayer body
100 Packaging container

The invention claimed is:

1. A food storing method, wherein food is packed and stored in a packaging container comprising an inside and an outside,
wherein the food comprises any of a chocolate confection and edible meat containing lipid in an amount of 1% by mass or more and 50% by mass or less;
wherein the packing container comprises a multilayer body comprising a sealing layer (A) comprising a thermoplastic resin on the inside, an oxygen absorption layer (B) comprising iron powder and a thermoplastic component, the thermoplastic component consisting of a thermoplastic resin, and an oxygen barrier layer (D) having oxygen barrier properties on the outside, the layers being laminated in a described order,
wherein the thermoplastic resin of the oxygen absorption layer (B) consists of an ionomer.

2. The food storing method of claim 1, wherein the packaging container further comprises an odor absorption layer (C) comprising a thermoplastic resin and an inorganic base between the oxygen absorption layer (B) and the oxygen barrier layer (D).

3. The food storing method of claim 2, wherein the inorganic base is an inorganic base having calcium.

4. The storing method according to claim 1, wherein the food has a water activity (Aw) of 0.3 or more and 1.0 or less.

5. The storing method according to claim 2, wherein the food has a water activity (Aw) of 0.3 or more and 1.0 or less.

6. The storing method according to claim 3, wherein the food has a water activity (Aw) of 0.3 or more and 1.0 or less.

* * * * *